May 9, 1933.   P. G. PALMGREN   1,908,269
ROLLING MILL
Filed Aug. 19, 1931   2 Sheets-Sheet 1

INVENTOR
PER GUNNAR PALMGREN
BY
ATTORNEY

Patented May 9, 1933

1,908,269

UNITED STATES PATENT OFFICE

PER GUNNAR PALMGREN, OF GOTTENBORG, SWEDEN, ASSIGNOR TO AKTIEBOLAGET SVENSKA KULLAGER-FABRIKEN, OF GOTTENBORG, SWEDEN, A CORPORATION OF SWEDEN

ROLLING MILL

Application filed August 19, 1931. Serial No. 558,014.

The present invention relates to rolling mills of the type in which the pressure on the rolls is transmitted to and taken up by rings surrounding the roll necks instead of by bearings in the usual manner. Rolling mills of this type have the advantage over rolling mills of the ordinary type that the bearings and stands are only required to withstand comparatively small radial loads and can therefore be dimensioned accordingly.

The use of rolling mills of this type has, however, been connected with certain drawbacks. It has thus been found that scale etc. falling on to the bearing surfaces of the rings and entering between the rings and the roll necks causes a radial movement of the rolls with consequent variation in thickness of the material being rolled. Further, the bearing surfaces of the rings and the roll necks thereby become indented and finally destroyed.

The purpose of the present invention is to provide means to prevent scale etc. from falling on to the rings.

Figure 1:
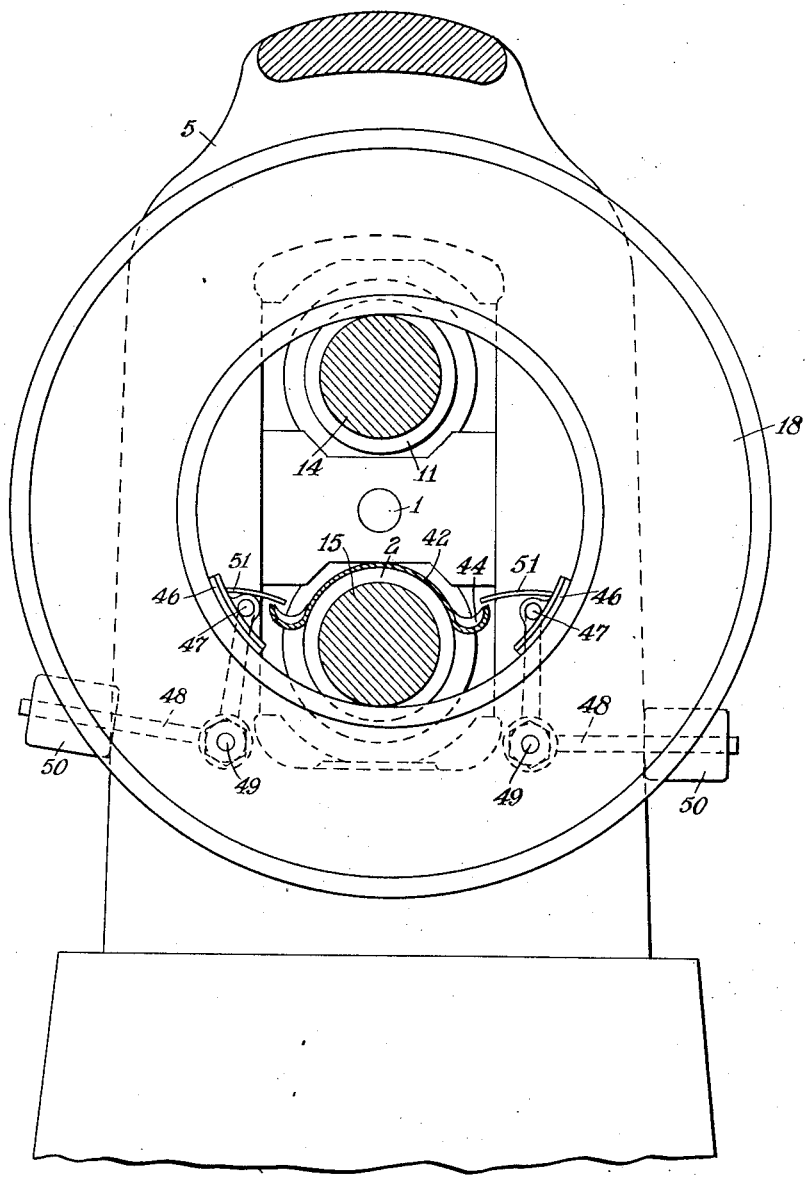
Figure 2:
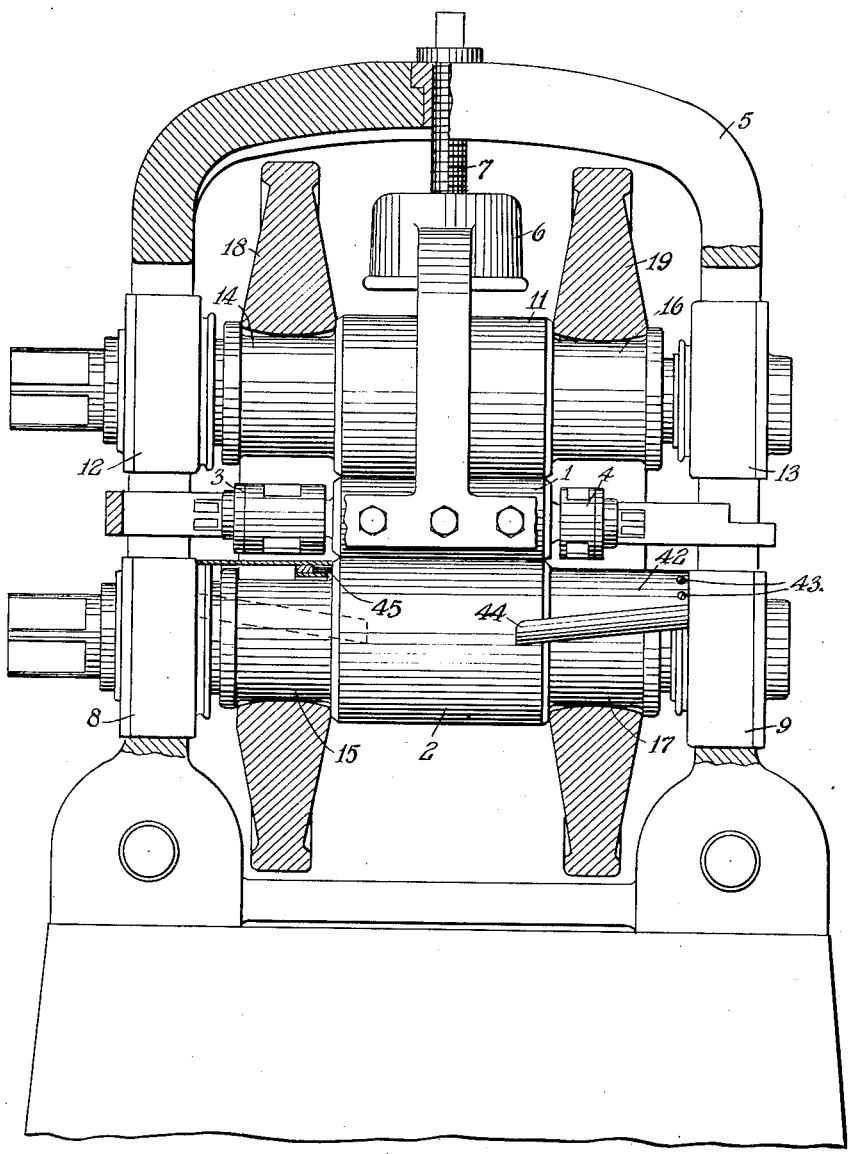

An embodiment of the invention is illustrated in the accompanying drawings, in which:

Figure 1 represents a front elevation, partly in section, of the rolling mill according to the invention, and Fig. 2 represents a side elevation, also partly in section.

The material is rolled between the rolls 1 and 2. The intermediate roll 1, in the preferred form, is carried in bearings mounted in housings 3 and 4 suspended from the stand 5 by means of the yoke 6. The yoke can be vertically adjusted by turning the screw 7. The lower roll 2 is carried in bearings mounted in housings 8 and 9 which are fixed in the stand 5. The upper roll 11 is in a similar manner carried in bearings mounted in housings 12 and 13 vertically slidable in the stand 5. Surrounding the roll necks 14—15 and 16—17 are rings 18 and 19.

When the material is introduced between the rolls 1 and 2 the rolling pressure is transmitted to these rings, the bearings in the housings 8, 9, 12 and 13 being only required to take up the comparatively small horizontal component of the rolling pressure and any thrust that may arise in the roll system. In the embodiment according to the illustration all the rolls are shown as being intended to be positively driven, although when roller bearings are used this is not necessary, it being sufficient to drive only one of the rolls.

Shields 42 are shown covering the upper part of the roll necks 15 and 17 of the lower roll 2. The shields 42 are attached to the housings 8 and 9 in a suitable manner as, for instance, by means of screws 43 and are provided at the sides with eaves 44 projecting inwardly past the rings 18 and 19. The shields 42 are provided at their inner edges with suitable sealing means 45 for the purpose of preventing scale from entering between the shield and the lower roll and falling on to the roll necks. The seals 45 can be suitably arranged to contact with the ends of the roll 2. Scrapers 46 are arranged to slide over the bearing surfaces of the rings 18 and 19 during the turning of the latter. The scrapers are pivoted at 47 to permit them to adjust themselves to the curvature of the rings. The pivots 47 are attached to one end of bell-crank levers 48 pivoted at 49. At the opposite ends of the bell-crank levers 48 are counterweights 50 adjustable on the levers for keeping the scrapers pressed against the tread of the rings 18 and 19. The scrapers 46 are provided with combined shields or conveyers 51 projecting over the eaves 44. Scale or other matter falling on to the rings 18 and 19 will be removed by the scrapers 46 and falling on to the shields 41 will finally drop into the eaves 44 and from there to the floor.

It will be understood that changes may be made within the scope of the claims without departing from the spirit of my invention.

Having thus described my invention, what I claim and desire to secure by Letters Patent is:

1. In a rolling mill having rolls located one above the other provided at their ends with roll necks and a pressure receiving ring surrounding the necks at each end, and extending below the necks of the lower roll of shields covering the roll necks of the lower roll and shielding the lower working surfaces of the rings as and for the purposes specified.

2. In a rolling mill having vertically aligned rolls provided at their ends with roll necks and bearing housings and pressure receiving rings surrounding the necks at each end, each ring surrounding and bearing against a plurality of the vertically alined roll necks, of shields carried by the bearing housings above the necks of the lower roll and eaves projecting past the rings for receiving scale falling from the shields.

3. In a rolling mill having vertically alined rolls provided at their ends with roll necks and bearing housings and pressure receiving rings surrounding the necks at each end, each ring surrounding and bearing against a plurality of the vertically alined roll necks, of shields carried by the bearing housings above the necks of the lower roll and eaves projecting past the rings for receiving scale falling from the shields, scrapers engaging the rings and a combined shield and conveyer leading from each scraper to the adjacent eave.

4. In a rolling mill having vertically alined rolls provided at their ends with roll necks and bearing housings and pressure receiving rings surrounding the necks at each end, each ring surrounding and bearing against a plurality of the vertically alined roll necks, of shields carried by the bearing housings above the necks of the lower roll and eaves projecting past the rings for receiving scale etc. falling from the shields, scrapers engaging the rings and a combined shield and conveyer leading from each scraper to the adjacent eave, and means for yieldably pressing each scraper against the ring with which it is associated.

5. In a rolling mill having a frame and vertically alined rolls, pressure receiving rings surrounding the ends of the rolls, each ring surrounding and bearing against a plurality of the vertically alined roll necks, of scrapers carried by the frame and located in position to remove scale etc. from the roll engaging portions of the rings, and adjustable weights for yieldingly pressing the scrapers against the rings.

Signed at Gottenborg, Sweden, this 3rd day of August, 1931.

PER GUNNAR PALMGREN.